Nov. 6, 1962     R. A. GLASER ETAL     3,062,057

INDICATING INSTRUMENT ANTI-FRICTION DEVICE

Filed April 7, 1959

INVENTORS.
RAYMOND A. GLASER
BRUNO STRAUSS
GERALD WEINSTEIN

BY

ATTORNEYS

United States Patent Office 3,062,057
Patented Nov. 6, 1962

3,062,057
INDICATING INSTRUMENT ANTI-
FRICTION DEVICE
Raymond A. Glaser, Kirkland, and Bruno Strauss and
Gerald Weinstein, Seattle, Wash., assignors to Electro
Development Corporation, Seattle, Wash., a corporation of Washington
Filed Apr. 7, 1959, Ser. No. 804,840
3 Claims. (Cl. 73—432)

This invention relates to a new and improved apparatus for overcoming static friction in indicator instruments such as airplane altimeters and the like and more particularly concerns a novel device by which kinetic energy impulses are applied periodically to the instrument in such manner as to free the needle or other movable element therein against sticking in any position in its operating range without causing objectionable side effects in so doing. The invention is herein illustratively described by reference to the presently preferred embodiments thereof; however, it will be recognized that various modifications and changes therein with respect to details may be made without departing from the underlying essentials involved.

While the problem is not confined to aircraft applications, there has been an increasingly serious problem with critical aircraft instruments sticking in different positions, particularly in the case of altimeters in jet engine aircraft which operate with relatively small engine vibration. Recent crashes attributed to altimeter failure of this type have pointed up the urgency of the problem. It will, of course, be evident that the continued improvement of airplane engines and structures to minimize structural vibrations will further increase any tendency for instruments to stick in different positions by static friction or binding tendencies.

In its broad aspect the present invention is directed to an improved means for substantially continuously subjecting an instrument, or instruments, to short term periodic acceleration forces sufficient to free moving parts from the static friction which may exist in a bearing, pivot, bushing, sleeve or other guide element, yet without in any way, impairing the accuracy of the indications provided by the instrument nor causing damage.

Devices heretofore conceived to overcome the static friction problem, in aircraft instruments particularly, have been of two general types: first, a continuously vibrating type such as an electric motor turning an eccentric mass, or a relay or other electromagnetic device subjected to alternating current; and, second, a type in which the instrument or panel was tapped in an indeterminate random fashion by means of a spring-suspended weight subjected to normal acceleration forces of the entire airplane. It has been determined, however, that devices in the first category cause objectionable noises due to instrument panel resonances and the like so that the pilot is likely to turn them off and chance the possibility of a sticking instrument rather than endure the annoyance. These devices were relatively bulky and heavy and consumed more power than necessary. Moreover, in the case of panel resonances, some instruments tended to vibrate more than others due to their respective locations near loops and nodes in the vibrational mode of the structure. The objection to devices in the second category is their relative unreliability under smooth flight conditions, producing insufficient airplane acceleration in normal or lateral directions so as to produce the requisite tapping action of the suspended weight.

The present invention is directed generally to overcoming these difficulties in prior devices and to provide a compact, reliable and efficient means for eliminating the effects of static friction in instruments.

Another object of the invention is such a means which permits use of a tapping or thumping unit sufficiently small and compact as to be mountable directly on the casing of an individual instrument and such that similar units may be mounted on other instruments subject to sticking. A related object is a system in which individual tapping units may be mounted on individual instruments, and may be controlled from a central impulse energy source and in such manner as to permit regulating the relative magnitude of the tapping forces applied to the instruments individually, if desired, in order to achieve optimum operation in each instance. Such an arrangement provides flexibility and versatility, and permits reliable action on the instruments individually and independently of their positions in the instrument panel and their relationship to one another. Moreover, the applied tapping forces may be small since only the individual instruments need be accelerated and not an entire instrument panel or other relatively large structure.

Another object is to provide means which are inherently quiet in operation due to the low fundamental frequencies involved, the brevity of the impulse used and the relatively small masses which are accelerated and decelerated, and due also to the ease of acoustically insulating the principal noise source comprising the impact element which imparts kinetic energy impulses to an individual instrument.

A more specific object is the provision of apparatus of the described type which performs its full function with a very low average power requirement and which may be energized from an electrical energy source of relatively low current capacity.

A further specific object is the provision of a relay-operated impulse device wherein the factor of contact wear in the relay is virtually eliminated as a limitation on the life of the relay, and furthermore wherein the problem of electromagnetic energy radiation affecting radio reception, which is a problem in aircraft and similar applications, is readily eliminated.

Still another object is a device of the character described which is readily adapted for miniaturization and which is highly versatile in its applicability to instruments of all types and sizes and environmental settings.

In brief terms, the invention as herein disclosed comprises an electromechanical transducer unit physically attached to or directly connected with an instrument case and including a normally retracted element driven into impact with a cushioning element, interposed between the instrument case and the adjacent end of the armature element, and means operable to apply periodic impulses to said unit which are short in duration relative to the interval therebetween. Like transducer units supplied with impulses from the same generator may be installed directly on other individual instruments as required, it being possible to make these units relatively small and compact for this purpose because of the relatively short duty cycle and the fact that a small moving mass which, on impact, imparts its kinetic energy to the instrument casing is capable of effecting the necessary acceleration of the instrument casing in order to free the moving elements of the instrument from static friction. The short duty cycle and resulting design prerogatives permitted thereby eliminates noise as a problem and also permits quite extreme miniaturization of the impulse generator. Further it minimizes average power requirements. Nevertheless the definite and recurrent impulse rate assures reliable and consistent operation of all instruments to which the system is applied, with minimum weight and bulk penalty in already crowded aircraft instrument panels.

In one form the invention comprises an impulse generator utilizing an electromechanical relay having contacts in series with the transducer unit or units, which relay is shunted across the transducer voltage source and itself is shunted by a condenser operable to permit substantially complete discharge of an energy storage circuit output condenser before the relay is permitted to drop out. As a result the current which must be interrupted by the relay is at a relatively low value so that there is no appreciable arcing which could impair contact life and produce radio frequency noise. Transducer inductance in series with the relay assures that the current will be zero on contact closure, so that no arcing will occur at this time either.

In another form the electromagnetic transducer actuating coil also functions as the primary of a blocking oscillator transformer. This arrangement is particularly well suited for transistor control, although it may also be employed with vacuum tube control if desired.

These and other features, objects and advantages of the invention including certain details of the preferred embodiments thereof will become more fully evident from the following description by reference to the accompanying drawings.

Figure 1:
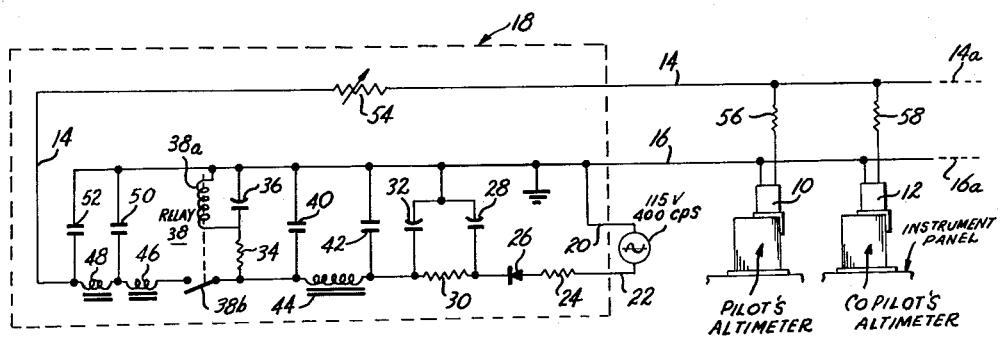
FIGURE 1 is a schematic diagram of the improved system in one form.

Referring to the drawings, the system illustrated in FIGURE 1 is shown applied to two altimeters. However, it will be evident that by proper design a single pulse generating circuit may be connected to operate any practical number of transducer units physically associated with a corresponding number of individual instruments. In the illustration the transducer unit 10 is mounted directly on the back side of the pilot's altimeter whereas the companion unit 12 is mounted directly on the back side of the co-pilot's altimeter, these instruments being mounted in the usual manner on the aircraft instrument panel. The dotted lines 14a and 16a illustrate the possibility of extending the energizing conductors 14 and 16 for connection to additional units if necessary or desired.

The pulse generating unit 18 in this instance comprises a physically separate unit, that is separate from the transducer units, and it may be mounted at any suitable location adjacent to or remote from the instrument panel. In some instances wherein a completely self-contained total unit is desirable, the components of the pulse generating unit 18 and the components of an individual transducer unit may be incorporated within the same package, this being made possible because of the features of the invention which permit miniaturization of the apparatus involved for successful application even for severe cases of instrument friction requiring unusually heavy tapping to fully eliminate sticking.

Direct current or alternating current supply may be used. In the typical aircraft installation electrical energy is available at 115 volts and 400 cycles. As shown in FIGURE 1, such voltage is applied to the pulse generator through conductors 20 and 22, the conductor 20 being connected to the conductor 16 within the chassis or otherwise in order to form a ground return lead. Alternating current from this energy source passes through a current-limiting resistance 24 and a half-wave rectifier 26 which, together with the condenser 28 connected between ground and the output side of rectifier 26 comprises a peak detector.

The output from this peak detector is applied to an R-C integrating circuit comprising the resistance 30 and the shunt capacitance 32. After each discharge of the condenser 32 representing an impulse delivered by the system, as subsequently described, the voltage of energy stored in the condenser 32 increases at an exponential rate in the usual manner.

Connected across the integrating condenser 32 is a series circuit comprising the resistance 34 and the capacitance 36 shunted by the coil 38a of relay 38. The capacitance 36 and coil 38a are on the ground side of the circuit whereas the resistance 34 is connected to the tension side. Interposed between the integrating circuit 30, 32 and the relay coil circuit is a pi-section filter network comprising the two condensers 40 and 42 and the interposed inductance 44 functioning to prevent radio-frequency currents, caused by opening and closing of the relay, from passing through the line comprising conductors 20 and 22.

The switch contactor 38b of relay 38 is connected directly in the conductor 14 feeding the transducers. A second radio-frequency filter network, comprising the two L-section filters including inductances 46 and 48 and capacitances 50 and 52, is interposed to prevent radio-frequency energy caused by switching action of relay 38 from passing out through conductor 14. As previously mentioned, the low current level at which the contactor 38b breaks its contact, as an incidental feature of the circuit, further reduces the possibility of any appreciable radio-frequency energy escaping from the unit 18 to produce radio interference.

In series with conductor 14 between the filters 46, 48, etc. and the transducer units to which the pulse generator is connected, is a variable resistance 54 by which pulse amplitude delivered to the units may be regulated.

With the illustrated circuit arrangement the input voltage may be either direct or alternating and the frequency of the alternating voltage may vary without materially affecting the operation.

Resistance 24 limits surge current which may otherwise occur when the system is first connected by switch means (not shown) to the electrical power supply of the aircraft. As the charge voltage of condenser 32 increases, a correspondingly increased voltage is applied to the divider network comprising resistance 34 and the parallel combination of condenser 36 and relay coil 38a. When the voltage developed across the relay coil and shunt condenser increases to the value required for actuation of the relay, the relay pulls in, closing contactor 38b and thus connecting the one or more transducer units 10, 12, etc., directly across the energy storage condenser 32. The resulting loss of charge stored in this condenser produces a brief impulse of current through the transducers as desired for momentary actuation thereof with a relatively high energy level, limited in magnitude by the setting of variable resistance 54. If desired, the individual transducer 10 may have a separate variable resistance 56 in series with it while the transducer 12 may have a separate variable resistance 58 connected serially in its energizing leads, in order thereby to permit independent variation of pulse amplitude applied to the individual transducers according to individual instrument optimum requirements. Alternatively, the winding resistances of the transducer units may be made different in order to produce different relative impulse amplitudes therein.

Figure 3:
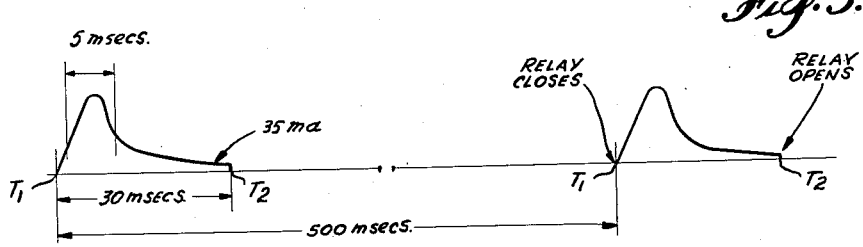
FIGURE 3 is a typical wave diagram illustrating the form of typical impulses applied to the transducer unit.

The important function of condenser 36, in addition to insuring adequate charge of the storage condenser and a definite actuation of the relay in conjunction therewith, is to maintain the relay 38 energized or in its actuated condition until condenser 32 is virtually discharged. At this time the residual current flow through the contacts 38b of the relay is very low so that when finally the relay drops out the amount of current which must be interrupted by opening of the relay contacts is very small (near zero). This is illustrated in FIGURE 3 wherein it will be seen that the current impulses rise rapidly to a high amplitude and then drop off exponentially to a relatively low amplitude, by the points of time T2 at which the current flow is interrupted. In a typical case as illustrated in the wave diagram the ratio of the duration time period of the individual pulses (T1–T2) is short in relation to the pulse interval, such as of the order of 30 milliseconds to 500 milliseconds. Moreover, the peak amplitude of the pulses is high (of the order of 0.7 to 2.1 amp., for example) in relation to the interruption current of the relay (i.e. of the order of 35 milliamps.). Consequently, relay contact life is not a problem and the life of the relay itself is determined by the ultimate fatigue failure of the relay spring rather than by failure of the contacts. The inductive nature of the load (i.e. of the transducer units) further helps in prolonging relay contact life by necessarily requiring that the initial current be zero at the instant of contact closure. As a result of these factors, together with the shortness of the duty cycle as a factor in minimizing heating of components, a relay may be used successfully which is very small and sensitive, and which requires very low power and operates over a relatively long useful life, despite the presence of relatively high peak current required to produce effective operation of the thumpers or transducer units. A typical circuit of the design illustrated in FIGURE 1 and which is capable of operating a few impulse transducers successfully for most airplane instrument applications has the following values:

| | Component size or type |
|---|---|
| Condensers: | |
| 28 | microfarads__ 60 |
| 32 | do____ 60 |
| 36 | do____ 5 |
| 42 | do____ 0.05 |
| 40 | do____ 0.05 |
| 50 | do____ 1 |
| 52 | do____ 0.05 |
| Inductances: | |
| 44 | microhenries__ 250 |
| 46 | do____ 250 |
| 48 | do____ 250 |
| Resistances: | |
| 24 | ohms__ 47 |
| 30 | do____ 3500 |
| 34 | do____ 10000 |

In general, the value of resistance 34 is selected to provide approximately 110 to 130 impulses per minute with 150 volts, 400 cycle supply at input conductors 20 and 22, whereas resistance 54 is chosen to provide impulses of a magnitude which imparts approximately a force of between 10 and 12 G to two (or more) transducer units connected to the pulse generator.

Figure 2:
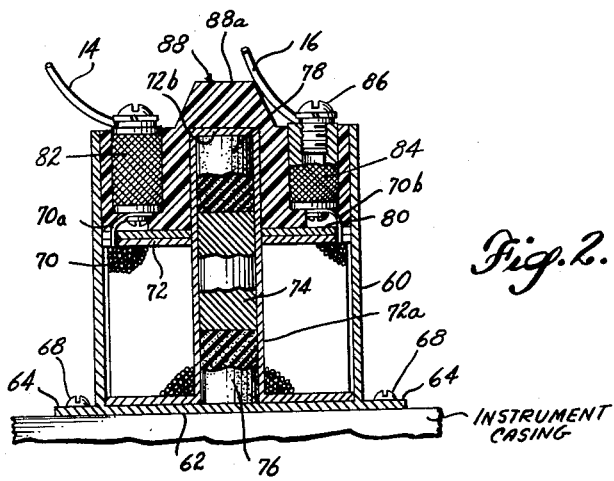
FIGURE 2 is a side view with parts broken away showing the presently preferred form of transducer unit mounted on an instrument case in accordance with one suitable method.

Referring to FIGURE 2, the preferred form of transducer comprises the ferromagnetic can or casing 60 of generally cylindrical form having a flat ferromagnetic end wall 62 with mounting tabs 64 by which the same is adapted to be installed in direct physical contact with the side or end of an instrument casing as by means of the mounting screws 68. The solenoid coil 70 is carried by a nonmagnetic bobbin 72 having a central tubular portion 72a which extends between the end plate 62 and a projecting cup-like extension 72b and constitutes a guide for the sliding ferromagnetic plunger or slug 74 received therein. Between the ends of the plunger 74 and the respectively adjacent ends of the guide tube are interposed the cylindrical elastic cushions 76 and 78 which are preferably slightly prestressed. These cushions may be made of any suitable elastic material such as a foamed rubber or plastic substance such as polyurethane, which latter is the preferred substance because of its long life and resilience. A ferromagnetic washer 80 is placed against the upper side of the bobbin surrounding the extension 72b to complete the ferromagnetic field pole structure of the transducer, and the coil leads 70a and 70b are brought out to terminal posts 82 and 84 suitably supported in the open end of the casing. The terminal assembly is potted with suitable insulation material 88 having a projecting central ridge or barrier 88a which acts as an insulator shield between the terminal posts. Conductors 14 and 16 are secured to the posts 82 and 84 by machine screws such as screw 86.

The elastic cushions 76 and 78 normally maintain the free plunger 74 in a position raised above the median position between the washer 80 and the end plate 62. Upon energization of the coil 70 with a current impulse as in FIGURE 3, the resulting magnetic force acting on the plunger tending to center it between these elements drives the same to, and by momentum, past center, and thereby abruptly against the end plate 62. In so doing it compresses the cushion 76 to a substantial degree of hardness sufficient to transmit a substantial sharp impulse of kinetic energy to the instrument casing. The presence of the cushion 76, however, has the effect of reducing the sharpness of the blow sufficiently to minimize any noise generated by the impact and also to eliminate any possibility of damage to delicate bearings within the instrument itself, yet the requisite friction-eliminating acceleration of the instrument is obtained. It will be evident that the cushion may be carried by the slug or plunger but that in the preferred embodiment as shown the cushion serves the additional purpose of cooperating with the opposing cushion 78 to silently return the plunger and maintain it in the retracted position, the cushions taking the place of a return spring of a conventional relay.

It will, of course, be evident that the details of electromagnetic transducer devices capable of thumping or tapping an instrument casing in response to short duty cycle impulses in accordance with the invention are subject to variation. Also, it will be recognized that the impulse generating circuit may vary as to form. That shown in FIGURE 1 comprises a form of relay-type relaxation oscillator of which there are various other forms including conventional relaxation oscillators utilizing gas types, multivibrators, blocking oscillators, etc. The various possible pulsing circuits may utilize vacuum tubes, gas tubes, transistors, gated diodes and other forms of switching devices. In the modified arrangement shown in FIGURE 4 a second preferred, in this instance transistorized, switching circuit is illustrated.

Figure 4:
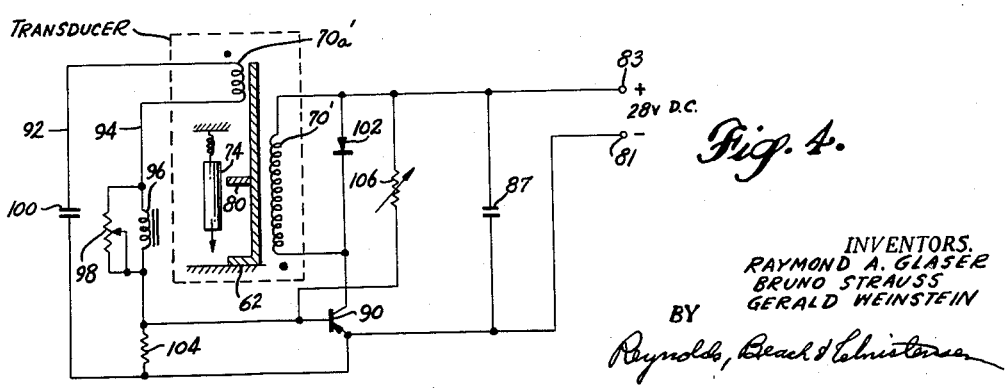
FIGURE 4 is a schematic diagram of a modified system.

In FIGURE 4 the switching circuit comprises a blocking oscillator type circuit wherein the transducer device functions also as a transformer, incorporating in addition to its primary or solenoid winding 70' a secondary winding 70'a with the relative polarities depicted in the figure. In this circuit, electrical energy from a 28 volt aircraft direct-current source applied at terminals 81 and 83 is isolated from radio frequency noise by filter capacitance 87. The voltage is applied to the transducer coil (primary) 70' through the emitter-collector electrodes of the transistor 90. As current through this winding increases, voltage is induced in the secondary winding 70'a which is connected by conductors 92 and 94 to the emitter and base electrodes, respectively, of the transistor and applies regenerative feedback to the transistor, driving the transistor-primary winding circuit toward saturation. The current which flows in the secondary winding circuit from the emitter to the base of the transistor passes through an inductance 96 interposed in the lead 94 and shunted by a variable resistance 98; also through a capacitance 100 interposed in the lead 92. The pulse length produced by this blocking oscillator circuit is determined partly by the values of the inductance 96 and the capacitance 100. An inductance is used for the purpose rather than a resistance in order to minimize the resistance in series with the emitter-base electrodes of the transistor.

During this saturation drive cycle of the transistor, the current flow which is established in the primary or principal winding 70' of the transducer causes it to act as a solenoid and, as in the description applied to the preceding figure, produces the required impulse of kinetic energy for tapping the instrument casing.

In typical blocking oscillator fashion, as the condenser 100 charge increases, its voltage ultimately bears such a relationship to that induced in the secondary winding 70'a as to result in decrease in the drive of the transistor. This decrease in the flow of current in the primary circuit of the transistor results in a further decrease in transformer secondary voltage and a further drop in the drive applied to the emitter and base electrodes of the transistor. The resulting action is a progressive degenerative action. Diode 102 connected across the primary winding 70' with the polarity indicated, has a quenching or damping function such that the reverse voltage which develops in the primary winding 70' during the degenerative cycle as a result of energy stored in the inductive circuit, is short-circuited by the diode and dissipated, thereby to prevent the occurrence of high voltage spikes or peaks which could damage the transistor 90.

In the foregoing described manner, the flow of energizing current in the primary winding 70' is reduced substantially to zero where it remains for a substantial period of time before conditions again develop which permit a reinitiation of the charging cycle. During this period the condenser 100 commences to discharge through the circuit comprising the secondary winding 70'a, the inductance 96 shunted by resistance 98, and a resistance 104 interconnecting the ends of the inductance 96 and condenser 100 opposite the ends thereof connected to the secondary 70'a. The time constant of the resistance-capacitance elements of this discharge circuit for condenser C, affected slightly by the reverse diode characteristic of the base-emitter circuit of transistor 90, determines the "off" cycle time of the circuit, that is the effective duty cycle of the apparatus. Typically this time interval is established at approximately 500 milliseconds, whereas the length of the pulse produced by the circuit may be of the order of 5 milliseconds, providing a duty cycle of 1/100. This duty cycle may be changed by varying the values of resistance 104, inductance 96, capacitance 100, or the turns ratio between the primary and secondary windings 70' and 70'a of the transducer-transformer unit.

The form of circuit illustrated in FIGURE 4 lacks an R-C integrator in its power supply leads; however, it will be evident that the same may be provided if desired as in the case of FIGURE 1. The variable resistance 98 may be adjusted to vary the pulse length if desired, thereby to vary the kinetic energy imparted to the transducer plunger consequently the mechanical energy delivered to the instrument on which the transducer is mounted.

Typical values for the circuit of the design shown in FIGURE 4 may be as follows:

Windings:
    70'a _____turns__ 330
    70' _____do____ 550
Resistances:
    104 _____K__ 2.7
    98 _____K__ 1.0
Capacitances:
    100 _____microfarads__ 200
    88 _____do____ 0.22
Inductances:
    96 _____henries__ 0.05

A resistance 106 is also shown in the circuit being connected between the junction of condenser 88 and inductance 70' and the transistor base. This resistance cooperates with resistance 104 in a voltage divider circuit which established a certain bias voltage or potential on the base of the transistor in relation to the potentials at both collector and emitter. This resistance may be made variable, if desired, in order to provide a convenient means to vary the impulse rate of the circuit.

Typically, the voltage applied to this circuit having the values indicated above is of the order of 28 volts D.C. as indicated in the figure.

It will be recognized from the foregoing that the objects and purposes of the invention are attained in each of its different forms which provide relatively high power impulses to instruments at a sub-resonance frequency and with a relatively short duty cycle consuming very low average power. However, despite the short duty cycle and the low fundamental operating frequency instrumental error or uncertainty is still eliminated for all practical purposes. For example, in the case of an airplane changing altitude at the rate of 500 feet per minute and with the invention applied to an aneroid altimeter at an impulse rate of two per second, there can be at most an altitude uncertainty of but four feet.

The tapping frequency of the apparatus should preferably not appreciably exceed a value of the order of a few per second for optimum operation and to secure the advantages recited above to a maximum degree. Also abrupt mild shocks imparted at these frequencies are found to be more effective to eliminate instrument sticking in most cases than sustained vibrations of tolerable amplitude, probably because it is possible to produce greater accelerations and actual physical displacements of the critical instruments parts in the former case without incurring objectionable side effects.

These and other aspects of the invention will be evident to those skilled in the art based upon its disclosure herein of its preferred embodiments intended primarily for aircraft instruments.

We claim as our invention:

1. Apparatus for overcoming static friction in indicator instruments having in physical association therewith an instrument support structure, said apparatus comprising an electromechanical transducer having a reciprocative normally retracted hammer element therein and a housing in which such hammer element is guided to reciprocate between its retracted position and an opposite impact position, said housing being directly mountable on said support structure for transmitting the shocks of impacts of the hammer element to the instrument support structure, electrically energizable actuator means operable when so energized to drive the hammer element relatively rapidly to said impact position, return force applying means operable to return the hammer element to its retracted position in the periods between such energization of said actuator, a source of continuously recurrent discrete electrical energy impulses of short duration and relatively long intervals between successive impulses, and means energizingly connecting said source to said actuator means for recurringly driving the hammer element to impact position thereby, said transducer housing including a relatively noncompressible member rigid with the housing and disposed therein to arrest motion of the hammer element in its impact position, said return force applying means comprising an elastic and relatively compressible cushion member interposed between the impact member and said relatively noncompressible member, whereby the shock of impact is cushioned and the duration of the mechanical force impulse applied to the instrument is correspondingly prolonged, said transducer actuating means comprising a solenoid and the hammer element comprising a ferromagnetic element, means guiding such ferromagnetic element for movement through the solenoid substantially parallel to the solenoid axis, closure means disposed across the end of said guide means opposite from the noncompressible member, and resilient means interposed between the ferromagnetic element and said closure means, said resilient means and said cushion member being prestressed with the ferromagnetic element in its retracted position.

2. An electromechanical transducer having a casing mountable directly on support structure for an instrument subject to sticking by reason of static friction for transmitting to said structure shocks of impacts developed by said transducer, said transducer means being periodically energizable by electrical impulses and operable thereby to impart periodic brief shock forces to the instrument, said transducer further comprising, within said casing, a solenoid adapted for energization by such electrical impulses, means forming a guide passage extending lengthwise through said solenoid within said casing, closure means rigid with said casing disposed across respectively opposite ends of said guide passage, a ferromagnetic element received and movable freely within said guide tube for longitudinal reciprocation therein, and relatively compressible elastic inserts interposed between the respective closure means and the adjacent ends of the ferromagnetic element, said elastic inserts normally maintaining the ferromagnetic element in a predetermined retracted position withdrawn from its magnetically centered position within said solenoid, whereby upon energization of said solenoid the ferromagnetic element is driven magnetically toward and, by momentum, past such centered position to an opposite, impact position wherein one of the elastic inserts is compacted against the adjacent closure means.

3. The transducer defined in claim 2, wherein the elastic inserts comprise foamed material prestressed in the retracted position of the ferromagnetic element.

References Cited in the file of this patent

UNITED STATES PATENTS

| | | |
|---|---|---|
| 654,103 | Schrottke | July 17, 1900 |
| 2,001,335 | Urfer | May 14, 1935 |
| 2,458,692 | Downer | Jan. 11, 1949 |
| 2,561,355 | Fish | July 24, 1951 |
| 2,895,082 | Suyetani | July 14, 1959 |

FOREIGN PATENTS

| | | |
|---|---|---|
| 791,293 | Great Britain | Feb. 26, 1958 |